United States Patent [19]
Ozden et al.

[11] Patent Number: 5,724,543
[45] Date of Patent: Mar. 3, 1998

[54] VIDEO DATA RETRIEVAL METHOD FOR USE IN VIDEO SERVER ENVIRONMENTS THAT USE STRIPED DISKS

[75] Inventors: Banu Ozden, Summit; Rajeev Rastogi, New Providence; Abraham Silberschatz, Summit, all of N.J.

[73] Assignee: Lucent Technologies Inc., Murray Hill, N.J.

[21] Appl. No.: 491,755

[22] Filed: Jun. 19, 1995

[51] Int. Cl.$^6$ .................................................. G06F 13/14
[52] U.S. Cl. ................................................ 395/441; 348/7
[58] Field of Search ............................. 348/7; 395/441, 395/440, 439

[56] References Cited

U.S. PATENT DOCUMENTS

| | | | |
|---|---|---|---|
| 5,414,455 | 5/1995 | Hooper et al. | 348/7 |
| 5,455,934 | 10/1995 | Holland et al. | 395/404 |
| 5,497,244 | 3/1996 | Chargin, Jr. et al. | 386/109 |
| 5,530,557 | 6/1996 | Asit et al. | 386/125 |
| 5,544,327 | 8/1996 | Dan et al. | 395/250 |
| 5,581,784 | 12/1996 | Tobagi et al. | 395/826 |
| 5,583,561 | 12/1996 | Baker et al. | 348/7 |
| 5,583,995 | 12/1996 | Gardner et al. | 395/200.09 |
| 5,586,264 | 12/1996 | Belknap et al. | 395/200.08 |
| 5,590,381 | 12/1996 | Mourad | 395/872 |
| 5,592,612 | 1/1997 | Birk | 395/182.04 |
| 5,594,924 | 1/1997 | Ottesen et al. | |

OTHER PUBLICATIONS

F.A. Tobagi et al., "Streaming RAID: A Disk Array Management System For Video Files," Proceedings of ACM Multimedia, Anaheim, CA, 1993, pp. 393-399.

Y. N. Doganata, "A Cost/Performance Study of Video Servers with Hierarchical Storage," Multimedia, 1994 International Conference, May 1994.

Wei-Hsin Tseng, "A High Performance Video Server for Karaoke Systems," IEEE Transactions on Consumer Electronics, Aug. 1994.

Primary Examiner—Tod R. Swann
Assistant Examiner—Christopher S. Chow
Attorney, Agent, or Firm—Kenneth M. Brown

[57] ABSTRACT

A method for retrieving video data from a video server, the video data having been stored on a plurality of disks based on a disk striping technique. In accordance with one illustrative embodiment, the method comprises the steps of retrieving a predetermined number of bits from the plurality of disks in the video server, and storing that predetermined number of bits in a buffer memory, wherein the number of bits retrieved and stored is based on the number of disks and on the capacity of the buffer memory. These steps, which together may illustratively constitute one round of the video retrieval process, may be repeated until the entire video has been retrieved and, for example, transmitted to the intended recipient(s) at a required transmission rate.

15 Claims, 4 Drawing Sheets

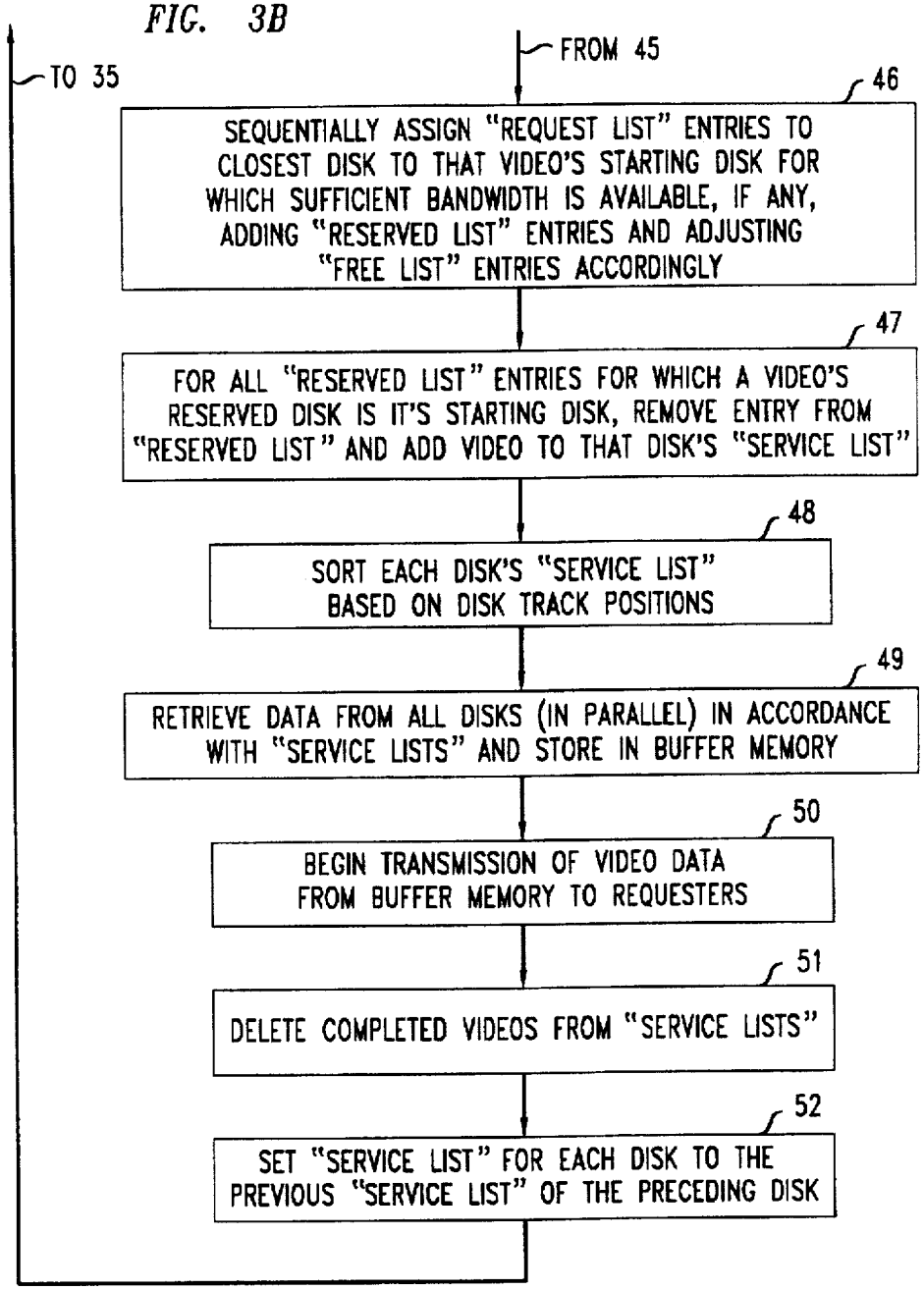
FIG. 3B
FIG. 4
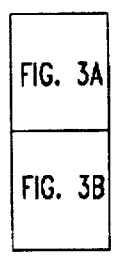

VIDEO DATA RETRIEVAL METHOD FOR USE IN VIDEO SERVER ENVIRONMENTS THAT USE STRIPED DISKS

CROSS-REFERENCE TO RELATED APPLICATION

The subject matter of this application is related to the U.S. Pat. application of B. Ozden, R. Rastogi and A. Silberschatz entitled "Coarse-Grained Disk Striping Method For Use In Video Server Environments," Ser. No. 08/492,315, filed on even date herewith and assigned to the assignee of the present invention.

FIELD OF THE INVENTION

The present invention relates generally to the field of video on demand (VOD) services and more particularly to a method for providing VOD services with the use of video servers having stored videos which are striped (i.e., divided into bands) across a plurality of disks in order to effectively utilize disk bandwidth.

BACKGROUND OF THE INVENTION

In recent years, we have witnessed significant advances in both networking technology and technologies involving the digitization and compression of video. It is now possible, for example, to transmit several gigabits of data per second over optic fiber networks. Also, with well-known compression standards like MPEG-1 as promulgated by the Motion Picture Experts Group, the bandwidth required for the transmission of a video may be as low as 1.5 Mbps. These advances have resulted in a host of new applications involving the transmission of video data over networks. Examples include video-on-demand, on-line tutorials, training and lectures, multi-media messaging, interactive TV, games, etc.

One of the key components in such applications is the video server which is responsible for the storage and transmission of videos. Depending on the application, a video server may be required to store hundreds of videos or more, and may be required to concurrently transmit data for hundreds or thousands of videos. Furthermore, the data for every video must be transmitted at a fixed rate depending on the compression technique employed. (For MPEG-1, for example, the required transmission rate is approximately 1.5 Mbps.)

Due to the voluminous nature of video data (a 100 minute long MPEG-1 coded video requires approximately 1.125 GB of storage space), and the high cost of random access memory (RAM) (which presently approximates $40/MB), storing videos in RAM is typically prohibitively expensive. A more practical mechanism for storing videos is to utilize mass storage devices such as disks, which are much cheaper than RAM. (Presently, the cost of disks is typically less than $1 for each megabyte of storage provided.) Thus, video servers which rely on disks instead of RAM as the primary mechanism for storage of videos tend be significantly more cost-effective. However, modem disks have limited storage capacity (1–9 GB) and relatively low transfer rates (30–60 Mbps). As a result, in order to be able to store hundreds of videos as well as support the retrieval of many videos concurrently at the required rates, a video server needs to store the videos on a plurality of disks.

Another characteristic of disks is that they have a relatively high latency for data access (typically between 10–20 ms). As a result, if very little data is retrieved during each disk access, then the effective transfer rate of the disk is reduced further, and thus the number of videos that can be concurrently retrieved is much less. On the other hand, retrieving large amounts of data during each disk access reduces the impact of disk latency and increases the throughput of the disk. However, data which is retrieved from the disk must typically be buffered in RAM before it can be transmitted to its intended destination. That is, a portion of the video data (which represents some period of time) is retrieved from the disk, buffered in the RAM, and then transmitted to its destination. This process is then repeated until the entire video has been retrieved and transmitted. (Each of these iterations is referred to as a "round.") As a result of the aforementioned buffering, however, increasing the amount of data retrieved from the disk beyond a certain point may not be cost-effective, since a large quantity of RAM would be required to buffer the large amounts of data retrieved, resulting in a significant increase in the cost of the server.

A video server that stores hundreds or thousands of videos would require a large number of disks to hold the video data. A naive storage scheme in which an entire video is stored on a single disk could result in an ineffective utilization of disk bandwidth, since not all videos may be accessed with the same frequency—clients may request to view certain videos more often than others, thus causing certain disks to be busy while others, with less frequently requested videos, remain idle. In addition, unless a video is replicated on several disks, the number of concurrent streams of the video that can be supported is bounded above by the bandwidth of the disk storing the video. As a result of these various considerations, schemes for laying out the videos across multiple disks are crucial to distributing the load uniformly across the various disks, thereby utilizing the disk bandwidth effectively. The challenge is to design a low-cost video server that can transmit numerous videos at the required rate concurrently, utilize the disk bandwidth effectively, and provide low response times to requests for video transmissions.

One popular method for storing videos across a plurality of disks is to use disk striping, a well-known technique in which consecutive logical data units (referred to as stripe units) are distributed across a plurality of (individually accessible) disks in a round-robin fashion. Disk striping, in addition to distributing the workload uniformly across disks, also enables multiple concurrent streams of a video to be supported without having to replicate the video. Specifically, there are at least two approaches to striping videos—fine-grained striping and coarse-grained striping. In fine-grained striping, the striping unit is typically a bit, a byte or a sector. Thus, if there are m disks, then every retrieval (i.e., round) involves all of the m disk heads, and the m disks behave like a single disk with bandwidth m times the bandwidth of each disk. In coarse-grained striping, the size of stripe units is much larger—it is the amount of data typically retrieved during a single disk access. Therefore, in contrast to fine-grained striping in which all disk heads are involved in data retrieval during each access, in coarse-grained striping only a single disk is usually involved at a time. For large requests and for sequential accesses to data, coarse-grained striping distributes the workload evenly among the various disks. Each of these disk striping techniques is well known to those skilled in the art and both are described, for example, in D. Patterson, G. Gibson and R. Katz, "A Case for Redundant Arrays of Inexpensive Disks (RAID)," Proceedings of ACM-SIGMOD 1988 International Conference on Management of Data, 1988.

SUMMARY OF THE INVENTION

We have recognized that the retrieval of videos from a video server which employs disk striping may be advantageously performed by basing the amount of data retrieved per round on the capacity of the RAM buffer memory and on the number of disks included in the video server. In this manner, the video server may be advantageously used to support the retrieval of a large number of concurrent video streams. Specifically and in accordance with one illustrative embodiment of the present invention, a method for retrieving striped video data is provided, the method comprising the steps of retrieving a predetermined number of bits from the plurality of disks in the server, and storing that predetermined number of bits in a buffer memory, wherein the number of bits retrieved and stored is based on the number of disks and on the capacity of the buffer memory. These steps, which together may illustratively constitute one round of the video retrieval process, may be repeated until the entire video has been retrieved and, for example, transmitted to the intended recipient(s) at the required transmission rate.

BRIEF DESCRIPTION OF THE DRAWINGS

FIGS. 3A & 3B show flow charts describing a method of retrieving coarse-grained striped videos in accordance with an illustrative embodiment of the present invention.

FIG. 4 shows how the flow charts of FIGS. 3A & 3B are to be interconnected.

DETAILED DESCRIPTION

An illustrative video server

Figure 1:
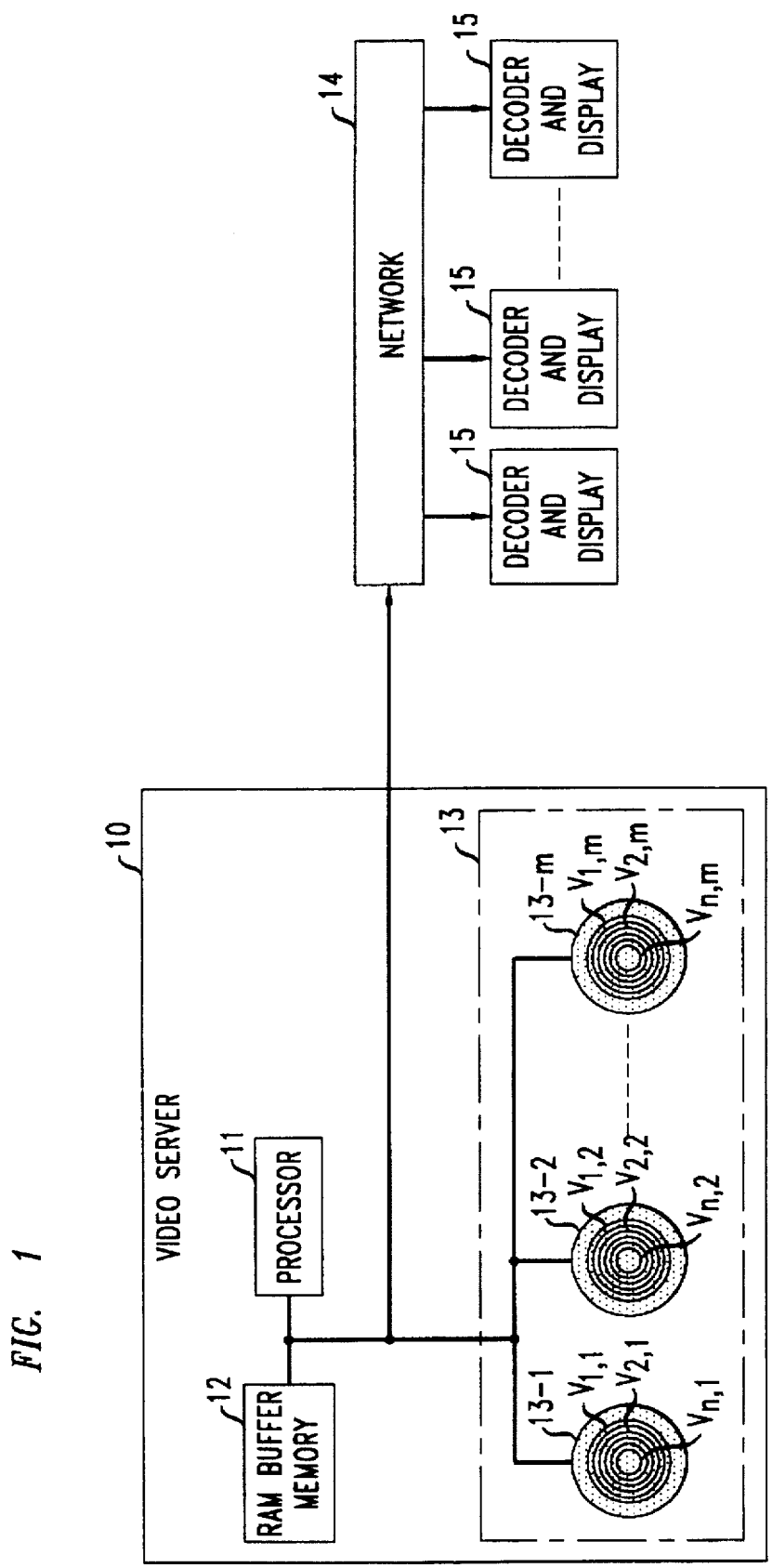
FIG. 1 shows a video server for providing VOD services in accordance with an illustrative embodiment of the present invention.

FIG. 1 shows video server 10 for providing VOD services in accordance with an illustrative embodiment of the present invention. The illustrative video-server is a computer system containing processor 11, RAM buffer memory 12, and a plurality of disks 13-1 to 13-m for the storage of videos. Specifically, a plurality of videos, $V_1$ to $V_n$, are stored on disks 13-1 to 13-m, preferably in compressed form, and are to be transmitted across high-speed network 14 at a certain rate, denoted herein as $r_{disp}$, to one or more recipients 15. The total length in bits of each video, $V_i$, will be denoted herein as $l_i$. Each video, $V_i$, is divided into a plurality of stripe units, $V_{ij}$, which are distributed across disks 13-1 to 13-m.

In operation, clients make requests for specific videos to the server which maintains a request list. Each of the entries in the request list contains an identifier for the requested video (e.g., the name of the video) and the set of clients who have requested the video. Requests are added to the request list as follows. If an entry for the requested video is already contained in the request list, then the client is simply added to the set of clients in the entry. If, on the other hand, an entry for the requested video is not contained in the request list, then a new entry containing the video and the client is appended to the end of the request list.

In general, it may not be possible to service each client request immediately upon arrival since videos reside predominantly on disks 13-1 to 13-m and they need to be retrieved into RAM buffer 12 before being transmitted to a client. In accordance with illustrative embodiments of the present invention, the server employs an illustrative procedure for determining the set of videos to be concurrently retrieved from disk at any given time. For each of the videos being retrieved concurrently, the server allocates a certain amount of buffer space in RAM 12, and retrieves portions of a given video into the buffer at certain time intervals such that the entire video is retrieved at a rate $r_{disp}$ as is required. That is, the server transmits videos to clients without loading the entire video into RAM 12, but rather, by loading only a portion of the video at a time. To start a video, a certain initial amount of the video data must be initially retrieved into RAM 12. Once this is accomplished, the transmission of the video to all the clients with outstanding requests for the video can commence. The continuous transfer of a given video from disk to RAM at rate $r_{disp}$ is referred to herein as a stream.

For purposes of understanding the advantages of the illustrative embodiments of the present invention described herein, it is important to understand the characteristics of disks, well-known to those skilled in the art. Data on disks is typically stored in a series of concentric circles, or tracks, and accessed using a disk head. Disks rotate on a central spindle and the speed of rotation typically determines the transfer rate of disks. Data on a particular track is accessed by positioning the head on the track containing the data, and then waiting until the disk rotates enough so that the head is positioned directly above the data. The positioning of the disk head on the desired track is typically referred to as a seek. Seeks typically consist of a coast during which the head moves at a constant speed, and a settle, when the head position is adjusted to the desired track. Thus, the total latency (i.e., delay) for accessing data on a disk is typically the sum of seek and rotational latency. Various disk parameters and typical values for a presently commercially available disk include an inner track transfer rate ($r_{disk}$) of 45 Mbps; a settle time ($t_{settle}$) of 0.6 ms; a (worst-case) seek latency ($t_{seek}$) of 17 ms; a (worst-case) rotational latency of ($t_{rot}$) of 8.34 ms; a (worst-case) total latency of ($t_{lat}$) of 25.5 ms; a cost ($C_d$) of $1500; and a capacity of 2 GB.

An illustrative method for retrieving fine-grained videos

In an illustrative method for retrieving fine-grained striped videos, the server maintains a service list that is distinct from the request list. This service list contains the videos for which data is currently being retrieved. The server retrieves data for the videos in the service list in a sequence of rounds, the number of bits retrieved for a video during each round being referred to herein as "d." The d bits retrieved for a video during a round follow the d bits retrieved for the video during the previous round. In accordance with an illustrative embodiment of the present invention, the value of d may be advantageously set based on the amount of RAM (referred to herein as D), and the number of disks (referred to herein as m) such that the number of concurrent streams that can be supported is maximized. (The determination of a value for d is described below.) In addition, d is advantageously a multiple of m multiplied by the stripe unit size (referred to herein as su). A video can thus be viewed as a sequence of portions of size d; each portion can further be viewed as a sequence of sub-portions, each of size m·su. Each sub-portion is striped across the m disks. Moreover, the stripe units contained in a sub-portion are advantageously located at the same position on their respective disks. In addition, stripe units on a disk, belonging to consecutive sub-portions of a portion, may be stored contiguously on each disk, one after another.

At the start of a round, the server sorts the videos in the service list based on the positions of the tracks on disk, of the d bits to be retrieved for each video. It then retrieves d bits from disk for each of the videos in the order of their appearance in the service list. Note that sorting the videos ensures that the disk heads move in a single direction when servicing videos during a round. As a result, random seeks to arbitrary locations are eliminated. Since the time to transmit d bits of video is $d/r_{disp}$, in order to ensure that data for every video is retrieved at rate $r_{disp}$, we require every round to begin $d/r_{disp}$ after the previous round. As a result, we require the time to service videos during a round to never exceed $d/r_{disp}$, the duration of a round. Since, during a round, disk heads travel across the disk at most twice, and since retrieving data for each video, in the worst case, incurs a settle and a worst-case rotational latency overhead, we require the following equation to hold (assuming that there are q videos in the service list):

$$2 \cdot t_{seek} + q \cdot \left( \frac{d}{m \cdot r_{disk}} + t_{rot} + t_{settle} \right) \leq \frac{d}{r_{disp}} \quad (1)$$

At the start of a round, before the server sorts the videos in the service list, it adds videos at the head of the request list to the service list as long as Equation (1) holds for videos in the service list after each of the videos is added. (Videos that are added to the service list are thereby deleted from the head of the request list.) For every video added to the service list, a buffer of size 2d is allocated. The d bits for the video are retrieved into the buffer during successive rounds. (While writing into the buffer, if the end of the buffer is reached, then further bits may be written at the beginning of the buffer. Similarly, while reading, if the end of the buffer is reached, then subsequent bits may be read from the beginning of the buffer.) Transmission of a video's bits to clients is begun only at the end of the round in which the first d bits of the video have been retrieved into it's buffer. The reason for this is that since new videos may be added to the service list, and since the videos are sorted at the start of each round, the times (relative to the start of a round) at which the d bits for a video are retrieved, may not be the same in two consecutive rounds. Thus, by ensuring that a video's buffer contains at least d bits at the start of each round, we ensure that bits for the video can be transmitted at a rate $r_{disp}$ irrespective of when during the round the next d bits are retrieved for the video. Finally, a video is deleted from the service list at the end of the round in which all the data for it has been retrieved.

In accordance with an illustrative embodiment of the present invention, a value for d may be computed based on the amount of RAM, D, and the number of disks, m, such that the number of concurrent streams that can be supported is advantageously maximized. From Equation (1) it follows that, for a given value of d, the maximum number of streams that can be supported is $$\frac{\frac{d}{r_{disp}} - 2 \cdot t_{seek}}{\frac{d}{m \cdot r_{disk}} + t_{rot} + t_{settle}} \quad (2)$$

Thus, since $r_{disp} < m \cdot r_{disk}$, as the value of d increases, the number of streams that can be supported also increases. However, since the buffer per stream is 2d and the total buffer requirements must not exceed D, increasing d beyond a certain value results in a decrease in the number of streams. Thus, the value of d that supports the maximum number of streams, can be obtained by solving the following equation:

$$\frac{2 \cdot d \cdot \left( \frac{d}{r_{disp}} - 2 \cdot t_{seek} \right)}{\frac{d}{m \cdot r_{disk}} + t_{rot} + t_{settle}} = D \quad (3)$$

Let $$d_{calc} = \frac{r_{disp}}{4} \cdot \left( 4 \cdot t_{seek} + \frac{D}{m \cdot r_{disk}} + \sqrt{\left( 4 \cdot t_{seek} + \frac{D}{m \cdot r_{disk}} \right)^2 + \frac{8 \cdot D \cdot (t_{rot} + t_{settle})}{r_{disp}}} \right)$$

be the maximum value for d obtained as a result of solving the Equation (3), and let $$q_{calc} = \frac{\frac{d_{calc}}{r_{disp}} - 2 \cdot t_{seek}}{\frac{d_{calc}}{m \cdot r_{disk}} + t_{rot} + t_{settle}} \quad (5)$$

be the maximum number of streams that can be supported with $d=d_{calc}$. Note that $2 \cdot d_{calc} \cdot q_{calc} = D$. The problem is that $d_{calc}$ may not be a multiple of m·su. For all values of d greater than $d_{calc}$, the maximum number of streams is D/2d. On the other hand, for values of d less than $d_{calc}$, the maximum number of streams is $$\frac{\frac{d}{r_{disp}} - 2 \cdot t_{seek}}{\frac{d}{m \cdot r_{disk}} + t_{rot} + t_{settle}} \quad (6)$$

Thus, it can be determined that an optimal value for d is either $\lceil d_{calc}/m \cdot su \rceil \cdot m \cdot su$ or $\lfloor d_{calc}/m \cdot su \rfloor \cdot m \cdot su$, depending on which of the following two equations—either Equation (7) or Equation (8) with $d=\lfloor d_{calc}/m \cdot su \rfloor \cdot m \cdot su$ (in the latter case)—is greater.

$$\frac{D}{2 \lceil \frac{d_{calc}}{m \cdot su} \rceil \cdot m \cdot su} \quad (7)$$

$$\frac{\frac{d}{r_{disp}} - 2 \cdot t_{seek}}{\frac{d}{m \cdot r_{disk}} + t_{rot} + t_{settle}} \quad (8)$$

Based on the above analysis, a value may be determined for d which maximizes the number of streams which can be supported when fine-grained disk striping is used. For example, if D=2 Gb and m=50, then, assuming that su is illustratively chosen to be 512 bytes and using the values for disk parameters as illustratively given above in the "illustrative video server" section above, d may advantageously be set to 7.1 Mb, and the maximum number of MPEG-1 streams that can be supported with use of such a retrieval scheme is 139. Note also that given the assumption that there is sufficient bandwidth available, in the worst case a request would be delayed for one round. Thus, the maximum response time is 4.7 seconds. For simplicity, in accordance with one illustrative embodiment of the present invention, video streams may be advantageously begun only based on the availability of disk bandwidth. Thus, d may be advantageously set to $\lfloor d_{calc}/m \cdot su \rfloor \cdot m \cdot su$. In other illustrative embodiments, the availability of buffer space may also be taken into account, in which case an optimal value for d may be selected as described above.

Figure 2:
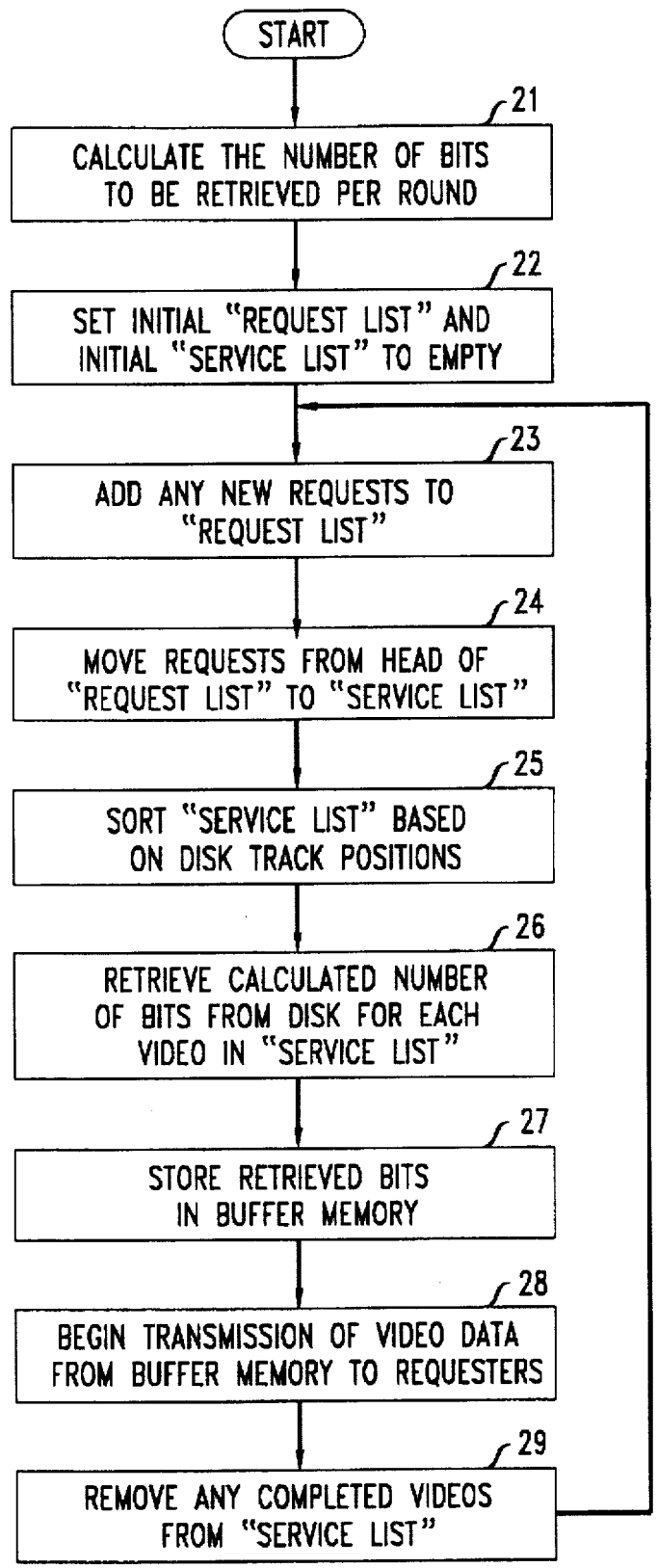
FIG. 2 shows a flow chart describing a method of retrieving striped videos in accordance with an illustrative embodiment of the present invention.

FIG. 2 shows a flow chart of the above-described method of retrieving striped videos in accordance with an illustrative embodiment of the present invention. Specifically, step 21 calculates the number of bits which is to be retrieved in each round for each video (referred to in the discussion above as "d"). These calculations are based on the number of disks in the video server and the capacity of the RAM buffer memory. In particular, the calculations may be made in accordance with the analysis as set forth above.

Once the number of bits which will be retrieved in each round is determined, requests for video retrieval may be received by the illustrative video server. These requests may, for example, be accumulated in a "request list," initially set empty in step 22. Step 22 also sets a "service list' to empty—this list will contain an ordered set of the videos which are being retrieved at any given point in time (i.e., during any given round).

Steps 23 to 29 are performed iteratively—each iteration represents one "round." Specifically, step 23 adds any new incoming requests to the request list. Step 24 moves entries from the head of the request list into the service list, as long as sufficient disk bandwidth will be available to service them. Equation (1) above may be used to make such a disk bandwidth determination. As each video is added to the service list it is deleted from the request list. Step 25 sorts the entries in the service list in accordance with their corresponding track positions on the disks. This ensures that the disk heads advantageously move in a single direction during the retrieval process performed in each round.

At this point, the retrieval process for the current round may begin. Step 26 retrieves the calculated number of bits from the disks for each video in the order of their appearance in the service list. As this data is retrieved from the disks, it is stored in buffer memory (step 27). (Note that twice the calculated number of bits should be allocated in the buffer memory for each video, since video data corresponding to one round will be stored therein while video data corresponding to the previous round is being transmitted therefrom.) Once the data for the given round has been retrieved from the disks and stored in the buffer memory, transmission of the video data from the buffer memory to the appropriate requesters may begin (step 28). Note that this transmission will continue while the video data for the next round is being retrieved.

Finally, in step 29, any completed videos are removed from the service list to make room for additional requests. Flow returns to step 23 where the processing for a new round begins.

An illustrative method for retrieving coarse-grained striped videos

In an illustrative coarse-grained striping scheme in accordance with the present invention, the size of a stripe unit, referred to herein as "d," is the same as the number of bits retrieved for a given video during each round. (The computation of an advantageous value to be used for d is described below.) Every video is assumed to have a length that is a multiple of d. This may, for example, be achieved by appending advertisements or by otherwise padding videos at their end. In accordance with the illustrative embodiment, the plurality of videos are first considered to be concatenated to form a "super-video." Consecutive stripe units of size d belonging to the super-video are then stored on the m disks in a round-robin fashion. The disk on which the first stripe unit of a video $V_i$ is stored is referred to herein as disk($V_i$). Note that with the illustrative coarse-grained striping scheme, disk($V_i$) and disk($V_j$) may be different for two different videos $V_i$ and $V_j$.

In the illustrative coarse-grained striping scheme, a separate service list is maintained for every disk. The service list for a disk contains the videos for which data is being retrieved from the disk during the current round. The data for a given video is retrieved into a buffer of size two times d. At the beginning of a round, the videos in each service list are sorted based on the positions of the tracks on disk of the d bits to be retrieved for each of the videos during the round. Following this, the d bits for videos in the service list for every disk are retrieved from the disk in the sorted order. Furthermore, data for videos in different service lists are retrieved in parallel. As a result, and since rounds must begin at intervals of $d/r_{disp}$ in order to retrieve data at a rate of $r_{disp}$, we require the following equation to hold (assuming that there are q videos in the service list):

$$q \cdot \left( \frac{d}{r_{disk}} + t_{rot} + t_{settle} \right) + 2 \cdot t_{seek} \leq \frac{d}{r_{disp}} \qquad (9)$$

At the end of a round, videos for which no more data needs to be retrieved may be deleted from the service lists. Then, the service list for every disk is set to the service list of the disk preceding it—the data to be retrieved for a video in the service list being the d bits in the video that follow the d bits retrieved for the video in the previous round from the preceding disk. Thus, data retrieved for a given video during successive rounds is retrieved from successive disks. Moreover, at the end of the round in which the first d bits have been retrieved for a given video, transmission of the video data to clients that requested that video is begun.

Several illustrative schemes that address the issue of when to begin retrieving data for videos in the request list or, equivalently, when to insert videos contained in the request list into the service list for a disk, are described below. All of these schemes may be employed by the server immediately before the service lists are sorted at the beginning of a round, and immediately after the service list for every disk is set to that of its preceding disk, at the end of the previous round. Note that if the number of videos serviced at a disk during a round is q, then the unutilized (i.e., the wasted and therefore available) bandwidth on the disk, during the round, is at least $$\frac{d}{r_{disp}} - q \cdot \left( \frac{d}{r_{disk}} + t_{rot} + t_{settle} \right) - 2 \cdot t_{seek}. \qquad (10)$$

The first (and most straightforward) scheme is to perform, for every request in the request list beginning with the first request, the following action: If for the requested video $V_i$ and the videos contained in the service list for disk($V_i$), Equation (9) holds, then the request is deleted from the request list and added to the service list for disk($V_i$). Even though this scheme utilizes the disk bandwidth fairly well, one disadvantage with this scheme is that it is possible that certain requests in the request list may never be serviced, thereby causing such requests to wait forever. This problem is referred to herein as "starvation." One variant of the aforementioned scheme may eliminate the starvation problem by adding a video to a service list only after videos preceding it in the request list have been added to service lists. However, one disadvantage with this approach is that it may result in disk bandwidth being unnecessarily wasted.

In accordance with an illustrative embodiment of the present invention, a starvation-free scheme prevents requests from experiencing starvation and, at the same time, utilizes disk bandwidth effectively. In order to prevent starvation, the scheme reserves available disk bandwidth for videos based on the order in which they appear in the request list. However, the assignment of reserved disk bandwidth to videos is such that the amount of disk bandwidth that is wasted is advantageously minimized. The scheme requires two additional data structures to be maintained. One of the data structures is a list of "(disk, video)" ordered pairs which stores information about the disk on which bandwidth for a video is reserved. This list is referred to herein as the "reserved list." The other data structure utilized by the starvation-free scheme is a "free list," which stores information relating to the available bandwidth on each disk. Specifically, the free list entries are "(disk, available bandwidth)" ordered pairs. For each reserved and free list entry, referred to herein as e, e(1) and e(2) denote the first and second elements of e, respectively. Assume that the m disks are numbered 0 through m−1. The "distance" from disk i to disk j is denoted by dist(i,j). If i=j, then dist(i,j) is simply j−i. Otherwise, dist(i,j) is m−i+j. Note that dist(i,j) may not be equal to dist(j,i). The distance between the disk on which available bandwidth is reserved for a video $V_i$ and disk($V_i$) is the number of rounds for which $(d/r_{disk})+t_{rot}+t_{settle}$ portion of a disk's bandwidth would be unutilized due to video $V_i$. It is also the number of rounds after which data retrieval for $V_i$ is begun. The available bandwidth for each disk in the free list is initially $(d/r_{disk})+2\cdot t_{seek}$. The reserved list is initially empty. The illustrative starvation-free scheme for inserting videos from the request list into service lists at the start of a round just before service lists are sorted is as follows:

1. For every reserved list and free list entry e, e(1) is set to (e(1)+1) mod m. (That is, the disk in each entry is set to the disk following it, thereby reflecting the advancement to the next round.)
2. For every video for which the last d bits were retrieved in the previous round from disk i, add the bandwidth available on disk (i+1) mod m to the free list as follows. Note that two variables, cur_entry and cur_disk are maintained—cur_entry is initially set to the first entry in the reserved list and cur_disk is set to (i+1) mod m.
   (a) If cur_entry is nil (i.e., empty), then add $(d/r_{disk})+t_{rot}+t_{settle}$ to the available bandwidth of the free list entry for cur_disk and go to Step 3.
   (b) If dist(cur_disk, disk(cur_entry(2)))<dist(cur_entry(1), disk(cur_entry(2))), then the values of cur_entry(1) and cur_disk are swapped.
   (c) cur_entry is set to the next entry in the reserved list (if any); then go to Step 2(a).
3. Once all the available disk bandwidth has been added to the free list, it is then reserved for requests in the request list as follows.
   (a) If either the request list is empty or, for every disk, the available bandwidth in the free list entry for the disk is less than $(d/r_{disk})+t_{rot}+t_{settle}$, go to Step 4. Otherwise, set cur_video to the video contained in the first request in the request list, and delete the request from the request list.
   (b) Let disk j be the disk for which available bandwidth in the free list is at least $(d/r_{disk})+t_{rot}+t_{settle}$, and for which dist(j, disk(cur_video)) is minimum. Append (j, cur_video) to the end of the reserved list.
   (c) Decrement $(d/r_{disk})+t_{rot}+t_{settle}$ from the available bandwidth for disk j in the free list; then go to Step 3(a). 4. For all entries e in the reserved list such that e(1)=disk(e(2)), delete e from the reserved list and insert e(2) into the service list for e(1). (The data to be retrieved for e(2) is the first d bits.)

In Step 1 of the illustrative procedure described above, the bandwidth available on a disk is set to the bandwidth available on the disk preceding it. It may be possible that for newly available bandwidth on disk (i+1) mod m (due to the completion of data retrieval for a video on disk i), swapping it with the disk assigned to some video in the reserved list could result in better bandwidth utilization. Thus, in Step 2, for a video $V_j$ in the reserved list, if disk (i+1) mod m is closer to disk($V_j$) than the disk currently assigned to $V_j$, then disk (i+1) mod m is assigned to $V_j$. The available bandwidth on the disk that was previously assigned to $V_j$ is then similarly assigned to some subsequent video in the reserved list. The assignments are repeated until the end of the reserved list is reached. In Step 3, available bandwidth in the free list is assigned to requests at the head of the request list, and finally, in Step 4, videos in the reserved list for which data retrieval can begin, are added to the service lists.

Note that in Step 2, since a video $V_i$ in the reserved list is not re-assigned to a different disk unless the disk is closer to disk($V_i$), it is not possible that data retrieval for any given video in the request list is delayed forever—thus, the illustrative scheme presented herein is starvation-free. Moreover, the scheme incurs very little overhead. The availability of new disk bandwidth results in a comparison being performed for every entry in the reserved list. Furthermore, the addition of a request into the reserved list results in a comparison with every disk entry in the free list, in order to determine the closest disk with the required available bandwidth.

Figure 3A:
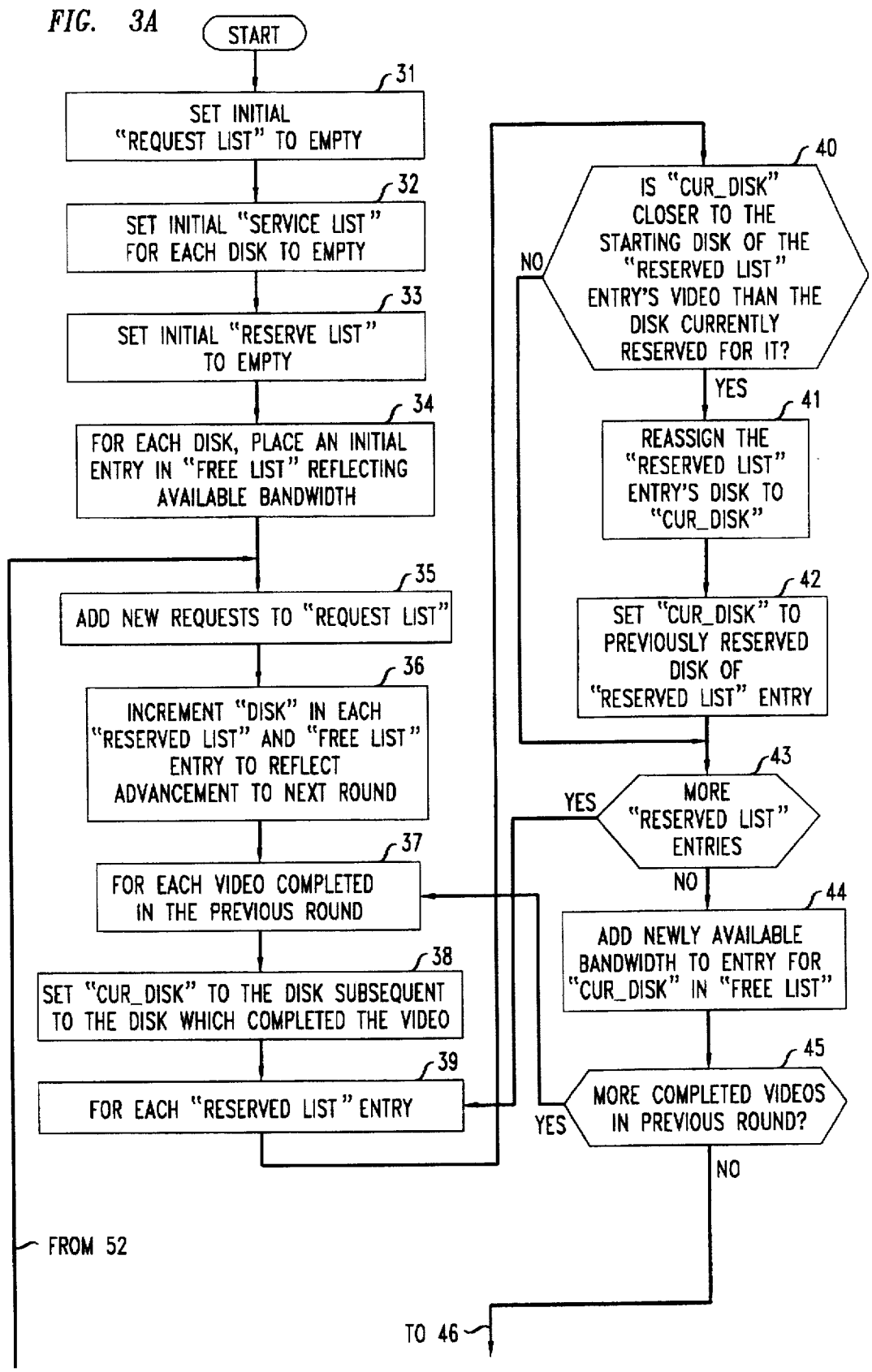

FIGS. 3A & 3B show flow charts of the above-described method of retrieving coarse-grained striped videos in accordance with an illustrative embodiment of the present invention. (FIG. 4 shows how the flow charts of FIGS. 3A & 3B are to be interconnected.) The initialization of the procedure comprises process boxes 31–34—process box 31 sets the initial "request list" to empty, process box 32 sets the initial "service list" for each disk to empty, process box 33 sets the initial "reserve list" to empty, and process box 34 places an initial entry reflecting the available bandwidth in the "free list" for each disk.

After initialization, process boxes 35–52 are performed iteratively—each iteration represents one "round." Specifically, process box 35 adds any new incoming requests to the "request list." Then, in order to reflect the advancement to the next round, process box 36 increments the "disk" component in each "reserved list" and "free list" entry. (Note that process box 36 corresponds to step 1 in the description of the illustrative procedure provided above.) Next, for each video for which the retrieval of which was completed in the previous round (process box 37), process box 38 sets the variable "cur_disk" to the disk subsequent to the disk which completed the video, and process boxes 39–43 scan the "reserved list" to optimize the disk assignments based on the newly available bandwidth.

In particular, for each "reserved list" entry (process box 39), decision box 40 determines whether the variable "cur_disk" is closer to the starting disk of the "reserved list" entry's video than the disk which is currently reserved for it. If it is, process box 41 reassigns the "reserved list" entry's disk to be "cur_disk," and process box 42 sets the variable "cur-disk" to the previously reserved disk of the "reserved list" entry. In other words, the disk having available bandwidth and the previously assigned disk are swapped when doing so would result in improved bandwidth utilization. Decision box 43 determines if there are more "reserved list" entries to consider, and, if so, returns the flow to process box 39.

When the end of the "reserved list" is reached, process box 44 assigns the newly available bandwidth by adding it to the entry for "cur_disk" in the "free list." Then, decision box 45 determines if there are more completed videos from previous round. If so, flow returns to process box 37 to process the associated newly available bandwidth. (Note that process and decision boxes 37–45 correspond to step 2 in the description of the illustrative procedure provided above.)

After all of the newly available bandwidth has been identified, the "reserved list" has been scanned to optimize the use thereof, and the "free list" has been updated therewith, process box 46 assigns the available bandwidth to requests at the head of the request list as described above in step 3 (i.e., process box 46 corresponds to step 3 in the description of the illustrative procedure provided above). In particular, "request list" entries are sequentially assigned (from the head of the list) to the closest disk to that video's starting disk for which sufficient bandwidth is available, if any. With each such assignment, a corresponding "reserved list" entry is created and a corresponding "free list" entries is adjusted accordingly.

Then, videos in the "reserved list" for which data retrieval can begin (i.e., videos for which the video's reserved disk is the same as it's starting disk) may be transferred from the "reserved list" to the starting disk's "service list." This is performed by process box 47, which corresponds to step 4 in the description of the illustrative procedure provided above. Finally, before retrieval of the data begins, process box 48 sorts each disk's "service list" based on disk track positions, to ensure efficient retrieval of the data for multiple videos from each of the disks.

The video data is retrieved from all disks in parallel by process box 49 in accordance with the "service lists," and the retrieved data is stored in buffer memory. Then, process box 50 causes the transmission of the video data from buffer memory to the appropriate requesters to begin. Finally, in order to prepare for the next "round," process box 51 deletes all completed videos from the "service lists," and process box 52 sets the "service list" for each disk to the (previous) "service list" of the immediately preceding disk.

Note that each assignment of a request to a disk (and each reassignment which occurs when the "reserved list" is scanned after the completion of a video) effectuates the scheduling (or rescheduling) of when the given request will begin to be serviced (i.e., when the retrieval of the given video will begin). That is, since the disk numbers in each "reserved list" entry are incremented at the start of each round, and since "reserved list" entries are transferred to a "service list" when the "reserved list" entry's disk matches the starting disk of its video, it can be seen that the "distance" (as defined above) from the disk number in the "reserved list" entry to the starting disk of its video is, in fact, the number of rounds that will elapse before the retrieval of the given video will commence. Thus, the illustrative procedure for inserting videos from the "request list" into "service lists" as detailed above in steps 1–4 and as shown in the flow charts of FIG. 3A & 3B in boxes 36–47 can actually be thought of as a request scheduling/rescheduling procedure.

Determining an advantageous stripe size for coarse-grained striped videos

For coarse-grained striped videos, it is also advantageous to use a value of d such that the number of concurrent streams that can be supported by the illustrative video server in accordance with the present invention may be maximized. Note that for a given value of d, the maximum number of streams that can be supported by each disk is $$\frac{\frac{d}{r_{disp}} - 2 \cdot t_{seek}}{\frac{d}{r_{disk}} + t_{rot} + t_{settle}}, \quad (11)$$

the maximum value for q obtained as a result of solving Equation (9) (and by the server, it is m times the amount). Furthermore, since the buffer per stream is 2d, and the total buffer requirements cannot exceed D, the optimal value for d can be obtained by solving the following equation:

$$2 \cdot m \cdot d \cdot \left( \frac{\frac{d}{r_{disp}} - 2 \cdot t_{seek}}{\frac{d}{r_{disk}} + t_{rot} + t_{settle}} \right) = D \quad (12)$$

Let $$d_{calc} = \frac{r_{disp}}{4} \cdot \left( 4 \cdot t_{seek} + \frac{D}{m \cdot r_{disk}} + \sqrt{\left( 4 \cdot t_{seek} + \frac{D}{m \cdot r_{disk}} \right)^2 + \frac{8 \cdot D \cdot (t_{rot} + t_{settle})}{r_{disp}}} \right)$$

be the maximum value of d obtained as a result of solving the above equation, and let $q_{calc}$ be the maximum number of streams that can be supported by each disk for $d=d_{calc}$. Note that $2 \cdot d_{calc} \cdot q_{calc} \cdot m = D$. The problem is that $q_{calc}$ may not be an integer. As a result, the maximum number of concurrent streams that can be supported by the server is $\lfloor q_{calc} \rfloor \cdot m$. Thus, since the RAM required to support $\lfloor q_{calc} \rfloor \cdot m$ streams may be substantially less than D, if $d_{\lceil calc \rceil}$ is the minimum value of d in order to support $\lceil q_{calc} \rceil$ streams from a disk, then by choosing the value of d to be $d_{\lceil calc \rceil}$, it may be possible for the server to support a larger number of concurrent streams. Since $d_{\lceil calc \rceil} \geq d_{calc}$, if $d=d_{\lceil calc \rceil}$, then the maximum number of streams that can be supported by the server is $$\lfloor \frac{D}{2 \cdot d_{\lceil calc \rceil}} \rfloor . \quad (14)$$

Depending on which of $\lfloor q_{calc} \rfloor \cdot m$ or Equation (14) is greater, the value of d is set to either $d_{calc}$ or $d_{\lceil calc \rceil}$.

Based on the above analysis, a value may be determined for d which maximizes the number of streams which can be supported in the illustrative coarse-grained striped video scheme. For example, if D=2 Gb and m=50, then, using the values for disk parameters as illustratively given above in the "illustrative video server" section above, d may advantageously be set to 0.9 Mb, and the maximum number of MPEG-1 streams that can be supported is 1011. Note that this is almost 7.5 times the maximum number of streams that can be supported with use of an analogous fine-grained striping scheme for the same values of D and m (see above). The reason for this is that the latency overhead per data access for the fine-grained scheme is m times the overhead per data access for the coarse-grained scheme. As a result, the value of $d_{calc}$ computed for the fine-grained scheme is larger than that computed for the coarse-grained scheme. As in the fine-grained case, in accordance with one illustrative embodiment of the present invention, video streams may for simplicity be advantageously begun only based on the availability of disk bandwidth. Thus, d may be advantageously set to $d_{calc}$. In other illustrative embodiments, the availability of buffer space may also be taken into account, in which case an optimal value for d may be selected as described above.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. A method for retrieving a stored sequence of bits representing video information, the sequence of bits having been stored on a fixed plural number, "m," of disks in accordance with a disk striping technique wherein the sequence of bits are adapted to be retrieved in a plurality of individual rounds, the method comprising the steps of:

retrieving, in a given one of said plurality of individual rounds, a predetermined number, "d," of said bits from said fixed plural number of disks; and storing said predetermined number of said bits in a buffer memory having a given fixed capacity, wherein said predetermined number "d" has been calculated based on said fixed plural number "m" and on said given fixed capacity of said buffer memory, and wherein said predetermined number "d" has been calculated further based on one or more performance characteristics of said disks.

2. The method of claim 1 wherein said disk striping technique comprises said sequence of bits being stored on said disks in stripe units of a predetermined size, and wherein said predetermined number "d" is a multiple of the product of said predetermined stripe unit size and said plural number "m."

3. The method of claim 1 wherein said performance characteristics comprise a disk transfer rate, a settle time, a seek latency and a rotational latency.

4. The method of claim 1 wherein said stored sequence of bits representing said video information has a required transmission rate associated therewith and wherein said predetermined number "d" is further based on said required transmission rate.

5. The method of claim 1 wherein said plural number of disks have stored thereon a plurality of sequences of bits, each of said sequences of bits representing different video information, and wherein the steps of retrieving the predetermined number of said bits and storing said predetermined number of said bits are performed on more than one of said plurality of sequences of bits representing different video information.

6. The method of claim 1 wherein the steps of retrieving the predetermined number of said bits and storing said predetermined number of said bits are performed a plurality of times on successive portions of said stored sequence of bits.

7. The method of claim 1 further comprising the step of transmitting said predetermined number of said bits stored in said buffer memory across a network to one or more requesters of said video information.

8. The method of claim 1 further comprising the step of calculating said predetermined number "d" based on said plural number "m" and on said given capacity of said buffer memory, and further based on said one or more performance characteristics of said disks.

9. A video server for retrieving a stored sequence of bits representing video information, the video server comprising a fixed plural number, "m," of disks, the sequence of bits having been stored on said fixed plural number of disks in accordance with a disk striping technique wherein the sequence of bits are adapted to be retrieved in a plurality of individual rounds;

means for retrieving, in a given one of said plurality of rounds, a predetermined number, "d," of said bits from said fixed plural number of disks; and a buffer memory having a given fixed capacity, the buffer memory for storing said predetermined number of said bits therein, wherein said predetermined number "d" has been calculated based on said fixed plural number "m" and on said given fixed capacity of said buffer memory, and wherein said predetermined number "d" has been calculated further based on one or more performance characteristics of said disks.

10. The video server of claim 9 wherein said disk striping technique comprises said sequence of bits being stored on said disks in stripe units of a predetermined size, and wherein said predetermined number "d" is a multiple of the product of said predetermined stripe unit size and said plural number "m."

11. The video server of claim 9 wherein said performance characteristics comprise a disk transfer rate, a settle time, a seek latency and a rotational latency.

12. The video server of claim 9 wherein said stored sequence of bits representing said video information has a required transmission rate associated therewith and wherein said predetermined number "d" is further based on said required transmission rate.

13. The video server of claim 9 wherein said plural number of disks have stored thereon a plurality of sequences of bits, each of said sequences of bits representing different video information, and wherein the means for retrieving retrieves, and the buffer memory stores, the predetermined number of said bits of more than one of said plurality of said sequences of bits representing different video information.

14. The video server of claim 9 further comprising means for transmitting said predetermined number of said bits stored in said buffer memory across a network to one or more requesters of said video information.

15. The video server of claim 9 further comprising means for calculating said predetermined number "d" based on said plural number "m" and on said given capacity of said buffer memory, and further based on said one or more performance characteristics of said disks.

* * * * *